US012766962B2

(12) United States Patent
Hamasaki et al.

(10) Patent No.: US 12,766,962 B2
(45) Date of Patent: Oct. 20, 2026

(54) INFORMATION PROCESSING DEVICE

(71) Applicant: TOYOTA JIDOSHA KABUSHIKI KAISHA, Toyota (JP)

(72) Inventors: Yutaka Hamasaki, Toyota (JP); Hiroshi Shikata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 18/732,789

(22) Filed: Jun. 4, 2024

(65) Prior Publication Data

US 2025/0128603 A1 Apr. 24, 2025

(30) Foreign Application Priority Data

Oct. 19, 2023 (JP) ................................ 2023-180419

(51) Int. Cl.
*B60K 35/80* (2024.01)
*B60K 35/28* (2024.01)

(52) U.S. Cl.
CPC .............. *B60K 35/80* (2024.01); *B60K 35/28* (2024.01); *B60K 2360/171* (2024.01); *B60K 2360/1868* (2024.01)

(58) Field of Classification Search
CPC .. B60K 35/80; B60K 35/28; B60K 2360/171; B60K 2360/1868; B60K 35/10; B60K 35/22; B60K 35/81; B60K 35/29
See application file for complete search history.

(56) References Cited

U.S. PATENT DOCUMENTS

| | | | | |
|---|---|---|---|---|
| 9,342,074 | B2 * | 5/2016 | Dolgov | B60W 60/0053 |
| 9,959,838 | B2 * | 5/2018 | Nagata | B60K 35/28 |
| 9,964,950 | B2 | 5/2018 | Takano | |
| 10,017,116 | B2 | 7/2018 | Sato | |
| 10,310,508 | B2 | 6/2019 | Kunisa et al. | |
| 10,452,930 | B2 | 10/2019 | Sato | |
| 10,663,973 | B2 | 5/2020 | Hashimoto et al. | |
| 10,895,875 | B2 | 1/2021 | Hashimoto et al. | |
| 11,001,198 | B2 | 5/2021 | Morimura et al. | |
| 11,275,382 | B2 | 3/2022 | Hashimoto et al. | |
| 2007/0294073 | A1 * | 12/2007 | Okamoto | B60K 35/81 703/20 |
| 2016/0328244 | A1 * | 11/2016 | Ahmed | B60K 35/23 |
| 2020/0262359 | A1 * | 8/2020 | Tanizawa | G06F 1/3265 |
| 2021/0229598 | A1 | 7/2021 | Morimura et al. | |
| 2021/0380124 | A1 | 12/2021 | Urano et al. | |

(Continued)

FOREIGN PATENT DOCUMENTS

| | | | |
|---|---|---|---|
| JP | H10-181482 | A | 7/1998 |
| JP | 2010-208559 | A | 9/2010 |
| JP | 2014-223010 | A | 11/2014 |

(Continued)

*Primary Examiner* — Rodney A Butler
(74) *Attorney, Agent, or Firm* — SoraIP, Inc.

(57) ABSTRACT

The information processing device includes: a first program for causing a display unit to display specific information specific to the host vehicle; an acquisition unit for acquiring a second program for causing the display unit to display common information common to the host vehicle and the other vehicle; and a control unit for causing the display unit to display the display information generated based on the first program and the second program acquired by the acquisition unit.

5 Claims, 5 Drawing Sheets

(56) References Cited

U.S. PATENT DOCUMENTS

2022/0024315 A1 1/2022 Tanibata
2023/0259354 A1* 8/2023 Tomokuni .............. G07C 5/008
717/168

FOREIGN PATENT DOCUMENTS

JP 2020-029212 A 2/2020
JP 2020-177072 A 10/2020

* cited by examiner

INFORMATION PROCESSING DEVICE

CROSS-REFERENCE TO RELATED APPLICATION

This application claims priority to Japanese Patent Application No. 2023-180419 filed on Oct. 19, 2023, incorporated herein by reference in its entirety.

BACKGROUND

1. Technical Field

The present disclosure relates to an information processing device.

2. Description of Related Art

Japanese Unexamined Patent Application Publication No. 10-181482 (JP 10-181482 A) discloses a vehicle control device that achieves both updating corresponding to changes in road data over time and vehicle control specific to a vehicle.

SUMMARY

In the technology of JP 10-181482 A, a navigation device that performs route guidance based on map data is provided as the vehicle control device. In recent years, it is common practice to notify a user using an in-vehicle display as in the case of the navigation device.

In recent years, there has been an increasing need for display contents on the in-vehicle display, such as a need to display information specific to a vehicle purchased by a user on the in-vehicle display. Hitherto, display control on a predetermined in-vehicle display is performed based on one program. Therefore, the program is individually developed, for example, for each vehicle type or specification of the vehicle, and specific information for each vehicle type or specification is displayed. Hitherto, it may be difficult to display the information specific to the vehicle on the in-vehicle display because the number of program development steps increases along with an increase in the vehicle types or specifications.

An object of the present disclosure is to provide an information processing device capable of presenting information specific to a vehicle to a user while reducing the number of development steps for a program related to display control on an in-vehicle display.

An information processing device according to one aspect of the present disclosure includes:

an acquisition unit configured to acquire a first program for causing a display unit to display specific information specific to a host vehicle, and a second program for causing the display unit to display common information common to the host vehicle and another vehicle; and a control unit configured to cause the display unit to display display information generated based on the first program and the second program acquired by the acquisition unit.

In the information processing device according to the above aspect, the acquisition unit acquires the first program and the second program. The control unit causes the display unit to display the display information generated based on the first program and the second program acquired by the acquisition unit. The display information includes the specific information that is specific to the host vehicle and is generated based on the first program, and the common information that is common to the host vehicle and the other vehicle and is generated based on the second program. By using the second program common to a plurality of vehicles including the host vehicle and the other vehicle to generate the display information in the vehicles, the number of development steps for the program related to the display control on the in-vehicle display is reduced. With the information processing device, it is possible to present the information specific to the vehicle to the user while reducing the number of development steps for the program related to the display control on the in-vehicle display by generating the display information based on the first program and the second program.

In the information processing device according to the above aspect, the specific information may be first specific information indicating an appearance of the host vehicle, and the control unit may be configured to cause the display unit to display, as the display information, information on a driving assistance function of the host vehicle.

In the information processing device according to the above aspect, the specific information is the first specific information indicating the appearance of the host vehicle. The control unit causes the display unit to display, as the display information, the information on the driving assistance function of the host vehicle. With the information processing device, it is possible to present the information on the driving assistance function to the user while showing the appearance specific to the host vehicle when the driving assistance function is executed.

In the information processing device according to the above aspect, the specific information may be first specific information indicating an appearance of the host vehicle, and the control unit may be configured to cause the display unit to display, as the display information, information on an energy flow of the host vehicle.

In the information processing device according to the above aspect, the specific information is the first specific information indicating the appearance of the host vehicle. The control unit causes the display unit to display, as the display information, the information on the energy flow of the host vehicle. With the information processing device, it is possible to present the information on the energy flow to the user while showing the appearance specific to the host vehicle.

In the information processing device according to the above aspect, the specific information may be second specific information indicating an appearance of the host vehicle and an open or closed state of a door, and the control unit may be configured to cause the display unit to display, as the display information, information on the open or closed state of the door of the host vehicle.

In the information processing device according to the above aspect, the specific information is the second specific information indicating the appearance of the host vehicle and the open or closed state of the door. The control unit causes the display unit to display, as the display information, the information on the open or closed state of the door of the host vehicle. With the information processing device, it is possible to present the information on the open or closed state of the door to the user while showing the appearance specific to the host vehicle and the open or closed state of the door.

The information processing device according to the above aspect may further include an updating unit configured to update at least one of the first program and the second program.

In the information processing device according to the above aspect, the updating unit is configured to update at least one of the first program and the second program. With the information processing device, it is possible to reduce the program update period for the host vehicle by updating the first program when there is an update of a portion specific to the host vehicle. With the information processing device, it is possible to reduce the time and effort of updating the program of the other vehicle by updating the second program when there is an update of a portion common to the host vehicle and the other vehicle and providing the updated second program to the other vehicle.

As described above, the information processing device according to the present disclosure can present the information specific to the vehicle to the user while reducing the number of development steps for the program related to the display control on the in-vehicle display.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the vehicle 10 according to the present embodiment will be described.

Figure 1:
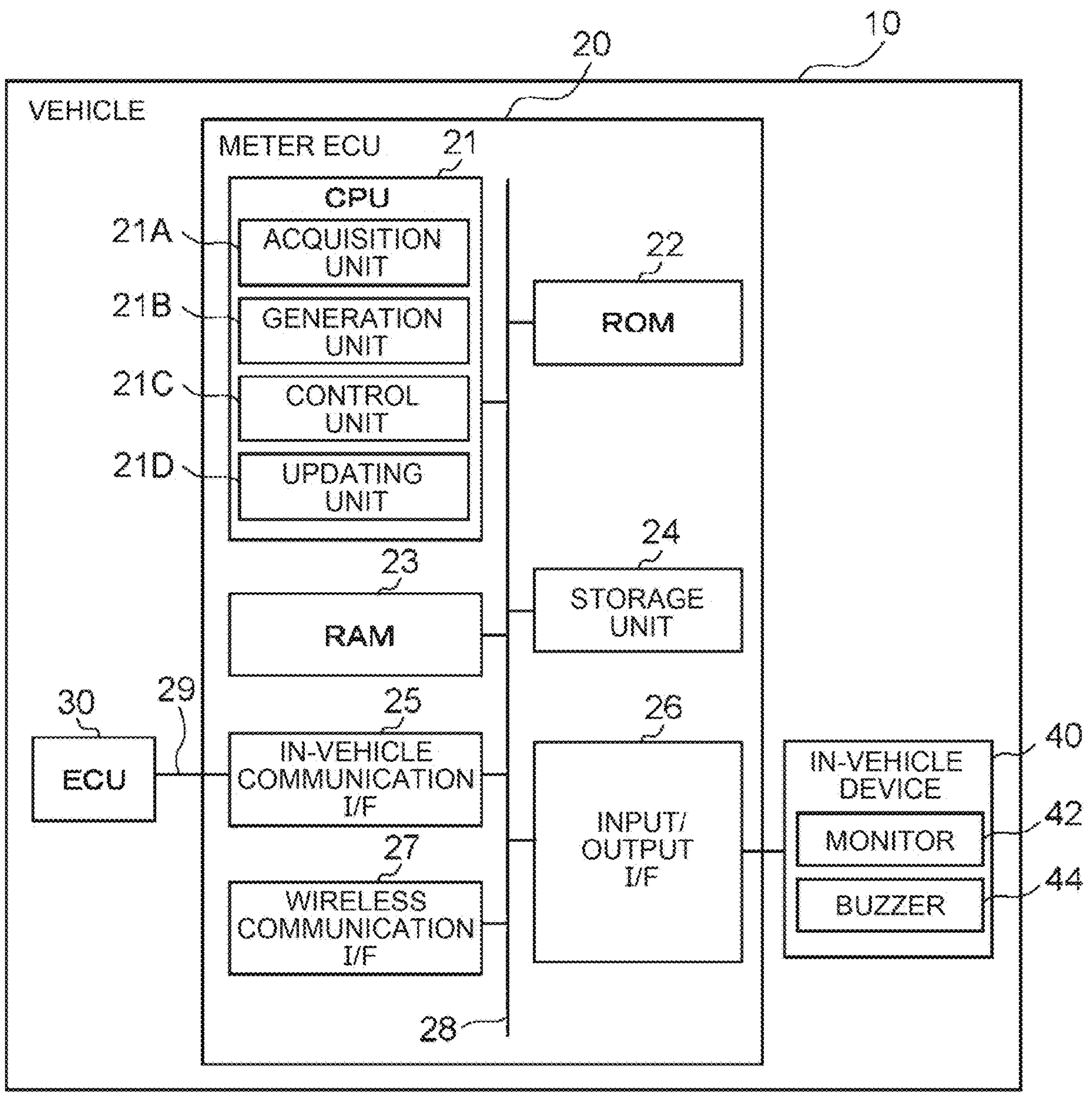
FIG. 1 is a block diagram illustrating a hardware configuration of a vehicle.

FIG. 1 is a block diagram illustrating a hardware configuration of a vehicle 10. As illustrated in FIG. 1, the vehicle 10 includes a meter ECU (electronic control unit) 20. The meter ECU 20 is an exemplary "information processing device".

The meter ECU 20 includes a CPU 21, ROM 22, RAM 23, a storage unit 24, an in-vehicle communication I/F (interface) 25, an input/output I/F 26, and a wireless communication I/F 27. CPU is an abbreviation for central processing unit. ROM is an abbreviation for read-only memory. RAM is an abbreviation for random access memory. I/F is an abbreviation for interface. CPU 21, ROM 22, RAM 23, the storage unit 24, the in-vehicle communication I/F 25, the input/output I/F 26, and the wireless communication I/F 27 are communicably connected to each other via an inner bus 28.

CPU 21 is a central processing unit that executes various programs and controls each unit. That is, CPU 21 reads the program from ROM 22 or the storage unit 24, and executes the program using RAM 23 as a working area. CPU 21 performs control of the above-described configurations and various arithmetic processes in accordance with programs recorded in ROM 22 or the storage unit 24.

ROM 22 stores various programs and various data. RAM 23 temporarily stores a program/data as a working area.

The storage unit 24 is constituted by a storage device such as an eMMC (embedded multimedia card) or an UFS (universal flash storage), and stores various programs and various data.

Figure 2:
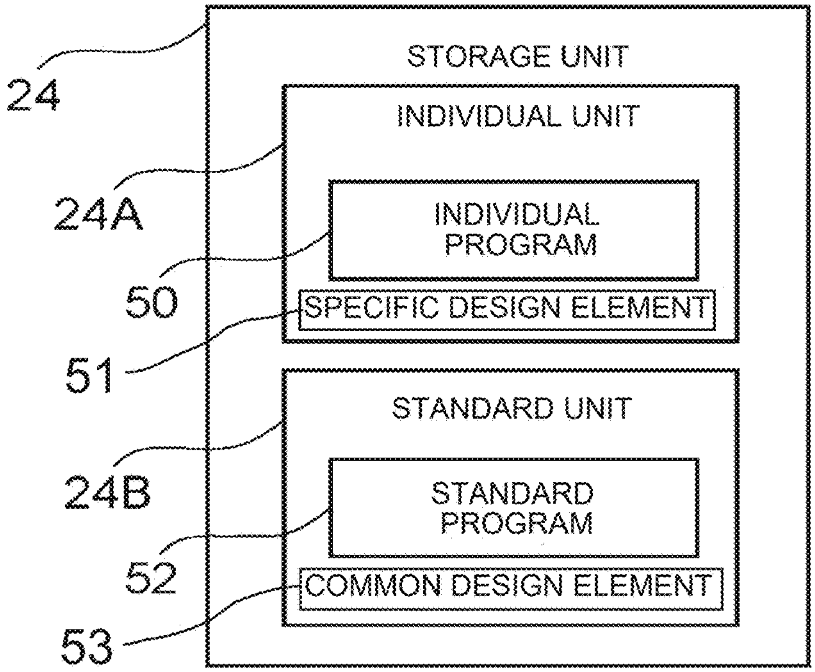
FIG. 2 is a block diagram illustrating a configuration of a storage unit.

FIG. 2 is a block diagram illustrating a configuration of the storage unit 24. As illustrated in FIG. 2, the storage unit 24 includes two storage areas, an individual unit 24A and a standard unit 24B.

The individual program 50 is stored in the individual unit 24A. The individual program 50 is a program dedicated to the host vehicle for displaying specific information specific to the host vehicle on a monitor 42 to be described later. In the present embodiment, the host vehicle is the vehicle 10. In the present embodiment, the specific information includes first specific information indicating the appearance of the vehicle 10 and second specific information indicating the appearance of the vehicle 10 and the opening/closing state of the door. The appearance of the vehicle 10 includes the shape and body color of the vehicle 10. Specific examples of the first specific information and the second specific information will be described later. The individual program 50 is an example of a "first program".

The standard unit 24B stores a standard program 52. The standard program 52 is a program for displaying common information common to the vehicle 10 and other vehicles on the monitor 42. In the present embodiment, the other vehicle is a vehicle of a different type from the vehicle 10 that is the host vehicle. A specific example of the common information will be described later. The standard program 52 is an example of a "second program".

Returning to FIG. 1, the in-vehicle communication I/F 25 is an interface for connecting to another ECU 30. The interface uses a CAN protocol-based communication standard. The in-vehicle communication I/F 25 is connected to an external bus 29. Although not shown, a plurality of ECU are provided for each function of the vehicle 10 in addition to ECU 30.

The input/output I/F 26 is an interface for communicating with the in-vehicle device 40 mounted on the vehicle 10.

The in-vehicle device 40 is a variety of devices mounted on the vehicle 10. The vehicle 10 includes a monitor 42 and a buzzer 44 as an example of the in-vehicle device 40.

The monitor 42 is provided on the meter panel, and is a liquid crystal monitor for displaying an operation proposal related to the function of the vehicle 10, an image related to the explanation of the function, and the like. The monitor 42 is an example of a "display unit".

The buzzer 44 is provided in the meter panel and is a device for outputting a predetermined warning sound.

The wireless communication I/F 27 is a wireless communication module for communicating with an external device. As the radio communication module, for example, communication standards such as 5G, LTE, Wi-Fi (registered trademark) and Bluetooth (registered trademark) are used.

Further, CPU 21 of the meter ECU 20 includes, as a functional configuration, an acquisition unit 21A, a generation unit 21B, a control unit 21C, and an updating unit 21D. The respective functional configurations are realized by CPU 21 reading and executing at least one of the individual program 50 and the standard program 52 stored in the storage unit 24.

The acquisition unit 21A acquires various types of data. For example, the acquisition unit 21A acquires data input from ECU 30 via the in-vehicle communication I/F 25, data input from a sensor group (not shown) as the in-vehicle device 40 via the input/output I/F 26, and the like as various types of information.

Further, the acquisition unit 21A acquires the individual program 50 from the individual unit 24A, and acquires the standard program 52 from the standard unit 24B.

The generation unit 21B generates display data to be displayed on the monitor 42 based on the individual program 50 and the standard program 52 acquired by the acquisition unit 21A. A specific example of the display information will be described later.

The control unit 21C causes the monitor 42 to display the display data generated by the generation unit 21B.

The updating unit 21D updates the individual program 50 and the standard program 52. In the present embodiment, the updating unit 21D uses OTA (over-the-air) technique to update the individual program 50 and the standard program 52 to the latest program.

Figure 3:
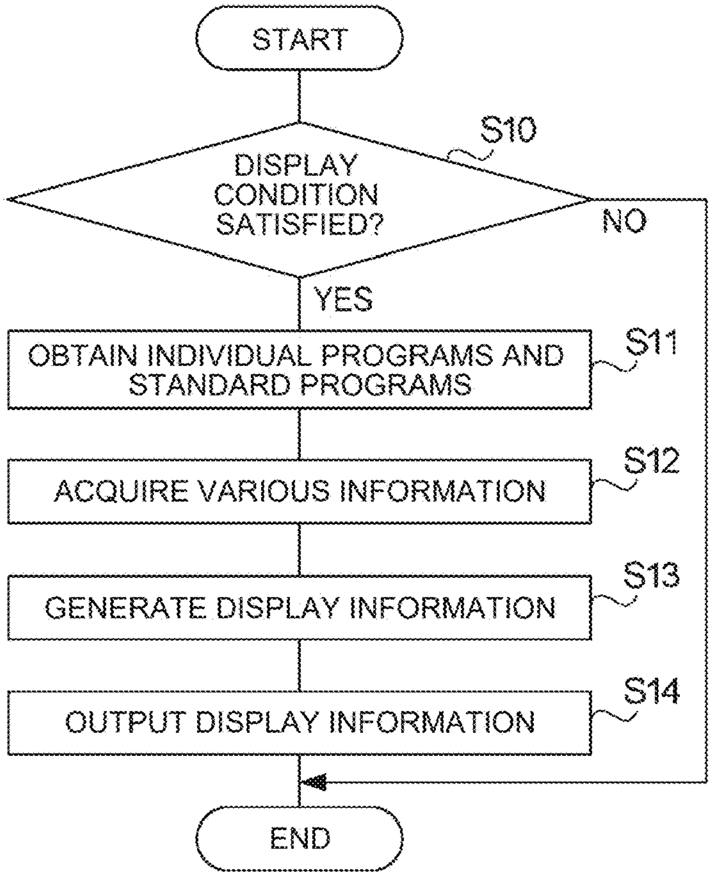
FIG. 3 is a flowchart illustrating a flow of a control process.

FIG. 3 is a flow chart showing a flow of a control process in which the meter ECU 20 controls the content displayed on the monitor 42. The control process is performed by CPU 21 reading out the individual program 50 and the standard program 52 from the storage unit 24, expanding the program into a RAM 23, and executing the program. As an example, the control process illustrated in FIG. 3 is periodically executed when an ignition switch (not illustrated) of the vehicle 10 is turned on.

In S10 illustrated in FIG. 3, CPU 21 determines whether or not a predetermined display-condition is satisfied. Here, CPU 21 proceeds to S11 when it is determined that the indication condition is satisfied (S10: YES). On the other hand, when CPU 21 determines that the display-condition is not satisfied (S10: NO), the control process ends.

In S11, CPU 21 acquires the individual program 50 from the individual unit 24A and acquires the standard program 52 from the standard unit 24B. Then, CPU 21 proceeds to S12.

In S12, CPU 21 acquires various types of data from ECU 30, the sensor group, and the like. Then, CPU 21 proceeds to S13.

In S13, CPU 21 generates the displayed information on the basis of the individual program 50 and the standard program 52 acquired by S11 and various kinds of information acquired by S12. Then, CPU 21 proceeds to S14.

In S14, CPU 21 outputs the display data generated by S13 to the monitor 42. As a result, the monitor 42 displays the display contents indicated in the display information. Then, CPU 21 ends the control process.

Next, an exemplary display that is displayed on the monitor 42 after the control process illustrated in FIG. 3 is performed by the meter ECU 20 will be described.

Figure 4:
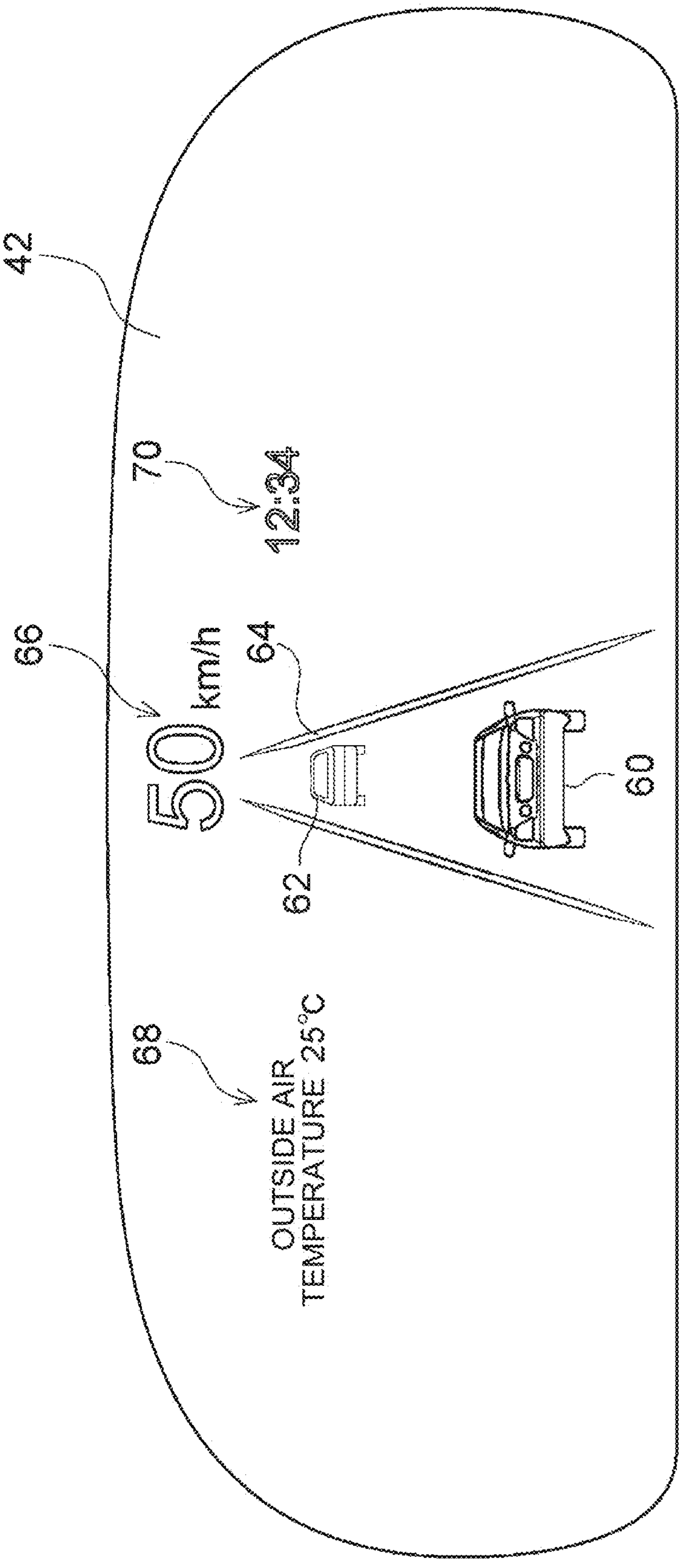
FIG. 4 is a first explanatory diagram illustrating a specific example of display information.

FIG. 4 is a first explanatory diagram illustrating a specific example of the display information. As an example, the display information illustrated in FIG. 4 is information related to a ACC (adaptive cruise control) function of causing the vehicle 10 to follow the preceding vehicle, which is a driving support function of the vehicle 10. In FIG. 4, it is assumed that the vehicle 10 executes an ACC function.

In the monitor 42 illustrated in FIG. 4, the host vehicle icon 60, the preceding vehicle icon 62, and the lane information 64 are displayed in the center of the monitor 42 as information related to ACC function. The host vehicle icon 60 indicates the vehicle 10 that is the host vehicle. The preceding vehicle icon 62 indicates a leading vehicle. The lane information 64 indicates a lane in which the vehicle 10 and the preceding vehicle travel. Further, on the monitor 42, vehicle speed information 66 indicating the vehicle speed of the vehicle 10 is displayed above the lane information 64 as information on ACC function. On the monitor 42, air temperature information 68 indicating the outside air temperature is displayed on the left side of the lane information 64 as information on ACC function. Further, on the monitor 42, time information 70 indicating the time is displayed on the right side of the lane information 64 as information on ACC function.

Here, in the display contents of the monitor 42 illustrated in FIG. 4, the host vehicle icon 60 is specific information. On the other hand, among the display contents of the monitor 42 illustrated in FIG. 4, the preceding vehicle icon 62, the lane information 64, the vehicle speed information 66, the air temperature information 68, and the time information 70 are common information.

Specifically, the specific design element 51 represented by the host vehicle icon 60 indicates an appearance when the vehicle 10 is viewed from the rear, which is generated based on the individual program 50. On the other hand, the common design elements 53 represented by the preceding vehicle icon 62, the lane information 64, the vehicle speed information 66, the air temperature information 68, and the time information 70 are designs common to the vehicle 10 and the other vehicles, which are generated based on the standard program 52 and various kinds of information.

Figure 5:
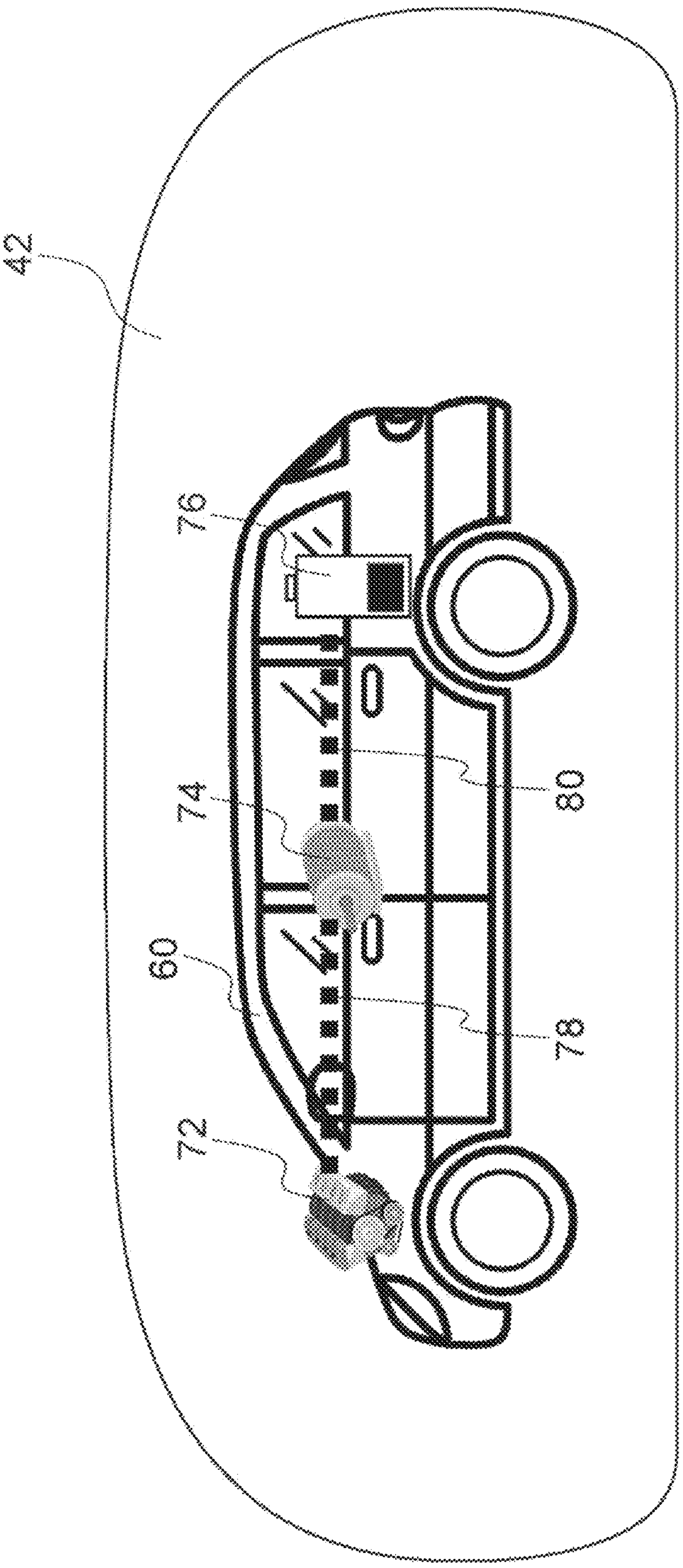
FIG. 5 is a second explanatory view illustrating a specific example of the display information.

FIG. 5 is a second explanatory diagram illustrating a specific example of the display information. As an example, the display information illustrated in FIG. 5 is information related to the energy flow of the vehicle 10. Specifically, FIG. 5 illustrates a state of transmission of energy transmitted between elements of the engine 72 and the motor 74, which are power sources constituting the vehicle 10, and the battery 76. In FIG. 5, it is assumed that the vehicle 10 is hybrid electric vehicle.

On the monitor 42 shown in FIG. 5, the host vehicle icon 60 is displayed as information on the energy flow. Further, on the monitor 42, a dashed line 78 and a dashed line 80 are displayed on the own vehicle icon 60 as information on the energy flow. The dashed line 78 illustrates the flow of energy between the engine 72, the motor 74, the battery 76, and the engine 72 and the motor 74. The dashed line 80 shows the flow of energy between the motor 74 and the battery 76.

Here, of the display contents of the monitor 42 illustrated in FIG. 5, the host vehicle icon 60 is specific information. On the other hand, among the display contents of the monitor 42 illustrated in FIG. 5, the engine 72, the motor 74, the battery 76, the dashed line 78, and the dashed line 80 are common information.

Specifically, the the specific design element 51 represented by the host vehicle icon 60 indicates the appearance of the vehicle 10 when viewed from the left side, which is generated based on the individual program 50. On the other hand, the common design elements 53 represented by the engine 72, the motor 74, the battery 76, the dashed line 78, and the dashed line 80 are designs common to the vehicle 10 and other vehicles, which are generated based on the standard program 52 and various kinds of information.

Figure 6:
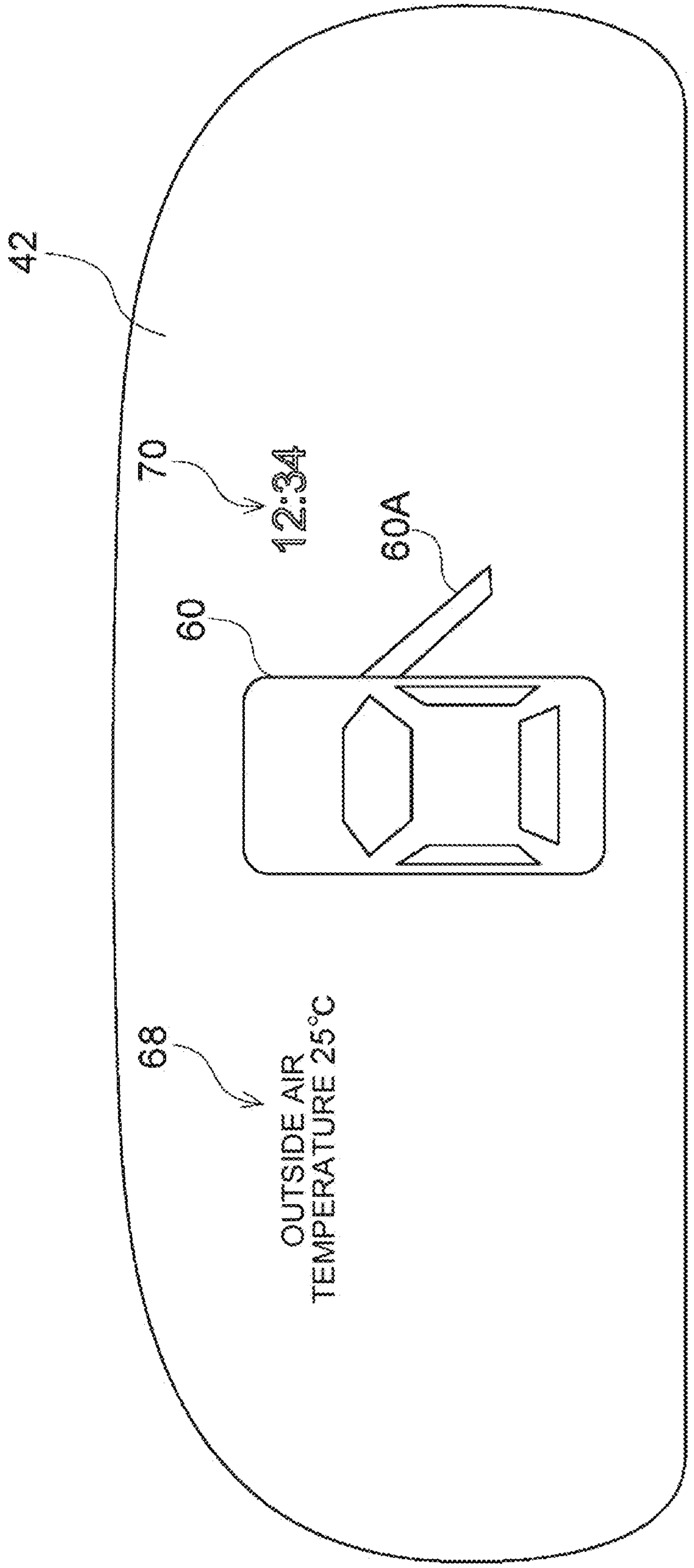
FIG. 6 is a third explanatory diagram illustrating a specific example of the display information.

FIG. 6 is a third explanatory diagram illustrating a specific example of the display information. As an example, the display information illustrated in FIG. 6 is information regarding an open/close state of a door of the vehicle 10. Specifically, FIG. 6 shows a state in which the driver's seat door of the vehicle 10 is open.

On the monitor 42 shown in FIG. 6, the driver's seat door 60A is opened and the host vehicle icon 60 is displayed as the information about the opening and closing status of the door. Further, on the monitor 42, the air temperature information 68 is displayed on the left side of the host vehicle icon 60 and the time information 70 is displayed on the right side of the host vehicle icon 60 as information on the opening and closing state of the door.

Here, among the displayed content of the monitor 42 illustrated in FIG. 6, the host vehicle icon 60 and the driver's seat door 60A are unique information. On the other hand, among the display contents of the monitor 42 illustrated in FIG. 6, the air temperature information 68 and the time information 70 are common information. Since the specific information includes the number of doors, for example, when two doors of the vehicle 10 are open, the specific design elements 51 as represented by a design in which the two doors are open is displayed on the monitor 42.

Specifically, the designs of the host vehicle icon 60 and the driver's seat door 60A show the appearance of the vehicle 10 with the driver's seat door open, which is generated based on the individual program 50 and various types of information, when viewed from above. On the other hand, the common design element 53 represented by the design of the air temperature information 68 and the time information 70 is a design common to the vehicle 10 and the other vehicle, which is generated based on the standard program 52 and various kinds of information.

As described above, in the meter ECU 20, CPU 21 acquires the individual program 50, the standard program 52, and various types of data. Then, CPU 21 causes the monitor 42 to display display information generated based on the acquired individual program 50, the standard program 52, and various kinds of information. Here, the display information includes specific information specific to the vehicle 10 generated based on the individual program 50 and common information common to the vehicle 10 and the other vehicle generated based on the standard program 52. By using the standard program 52 common to the plurality of vehicles to generate the display information in the vehicle 10 and the plurality of vehicles of the other vehicle, the number of development steps of the program related to the display control of the in-vehicle display is reduced. Therefore, according to the meter ECU 20, the display-information is generated based on the individual program 50 and the standard program 52. Accordingly, it is possible to present information specific to the vehicle 10 to the user while reducing the number of development steps of the program related to the display control of the in-vehicle display.

Further, in the present embodiment, the specific information includes first specific information indicating the appearance of the vehicle 10. In the meter ECU 20, CPU 21 generates display information based on the individual program 50 for displaying the first specific information on the monitor 42, the standard program 52, and various kinds of information. Then, CPU 21 causes the monitor 42 to display information related to ACC function of the vehicle 10 as the generated display information (see FIG. 4). Thus, according to the meter ECU 20, when ACC function is executed, it is possible to present the user with the information about ACC function while showing the appearance peculiar to the vehicle 10.

Further, in the meter ECU 20, CPU 21 generates display information based on the individual program 50 for displaying the first specific information on the monitor 42, the standard program 52, and various kinds of information. Then, CPU 21 causes the monitor 42 to display information related to the energy flow of the vehicle 10 as the generated display information (see FIG. 5). According to the meter ECU 20, it is possible to provide the user with information on the energy-flow while showing the appearance peculiar to the vehicle 10.

In addition, in the present embodiment, the specific information includes second specific information indicating the appearance of the vehicle 10 and the opening/closing state of the door. In the meter ECU 20, CPU 21 generates display information based on the individual program 50 for displaying the second specific information on the monitor 42, the standard program 52, and various kinds of information. Then, CPU 21 causes the monitor 42 to display, as the generated display information, information on the open/close status of the doors of the vehicle 10 (see FIG. 6). Thus, according to the meter ECU 20, it is possible to present the user with information about the opening/closing state of the door while indicating the appearance peculiar to the vehicle 10 and the opening/closing state of the door.

In the meter ECU 20, CPU 21 can update at least one of the individual program 50 and the standard program 52. Thus, according to the meter ECU 20, when there is an update of a part specific to the vehicle 10, the individual program 50 is updated, so that the update times of the program of the vehicle 10 can be reduced. Further, according to the meter ECU 20, when there is an update of a common part between the vehicle 10 and the other vehicle, the standard program 52 is updated, and the updated standard program 52 is provided to the other vehicle, whereby it is possible to reduce the time and effort for updating the program of the other vehicle.

Others

In the above-described embodiment, the individual unit 24A and the standard unit 24B are provided in the storage unit 24 of the meter ECU 20, the individual program 50 is stored in the individual unit 24A, and the standard program 52 is stored in the standard unit 24B. However, the present disclosure is not limited thereto, and ECU in which the individual program 50 is stored and ECU in which the standard program 52 is stored may be different. For example, the meter ECU 20 may be provided with an individual unit 24A, the individual program 50 may be stored in the individual unit 24A, the standard unit 24B may be provided in ECU 30, and the standard program 52 may be stored in the standard unit 24B.

In the above-described embodiment, the specific design elements 51 represented by design specific to the vehicle 10 generated based on the individual program 50 is set to the appearance of the vehicle 10 and the open/close state of the door, but the present disclosure is not limited thereto. For example, the specific design element 51 may be represented by a design of an opening screen displayed on the monitor 42 when the ignition switch is turned on. Further, the specific design element 51 may be represented by a design of a closing screen displayed on the monitor 42 when the ignition switch is turned off. In addition, the specific design element 51 may be the background color of the lane information 64 indicating the lane on which the vehicle 10 travels in FIG. 4. In this case, CPU 21 generates the background color in a color that is highly visible with respect to the vehicle body color of the vehicle icon 60 that reproduces and displays the appearance of the vehicle 10. As an example, CPU 21 generates the background color in a color in which at least one of a lightness difference and a hue difference between the background color and the vehicle body color is a contrast relation. The contrast relationship includes a complementary color contrast, a brightness contrast, a color relative ratio, and the like.

In the above-described embodiment, at least one of the sound outputting program and the light emitting program may be stored in the individual unit 24A in addition to the individual program 50. The sound output program is a program for outputting a specific sound specific to the vehicle 10 from the buzzer 44. The light emission program is a program for causing the monitor 42 to emit light with a light intensity specific to the vehicle 10.

In the above-described embodiment, the other vehicle is a vehicle of a different type from the vehicle 10 that is the host vehicle, but the present disclosure is not limited thereto. For example, the other vehicle may be a vehicle having a different specification from that of the vehicle 10.

In the above-described embodiment, the information on ACC function is illustrated in FIG. 4, but the information on ACC function is not limited to the content illustrated in FIG. 4. For example, the information related to ACC function may be information obtained by adding new information to the content illustrated in FIG. 4, or may be information obtained by deleting some information from the content illustrated in FIG. 4. Similarly, although the information regarding the energy flow is illustrated in FIG. 5, the information regarding the energy flow is not limited to the contents illustrated in FIG. 5. For example, the information on the energy flow may be obtained by adding new information to the contents shown in FIG. 5, or may be obtained by deleting some information from the contents shown in FIG. 5. Similarly, although the information regarding the open/close state of the door is illustrated in FIG. 6, the information regarding the open/close state of the door is not limited to the contents illustrated in FIG. 6. For example, the information on the open/close state of the door may be obtained by adding new information to the contents shown in FIG. 6, or may be obtained by deleting some information from the contents shown in FIG. 6.

In the above-described embodiment, the information regarding the driving assistance function of the vehicle 10 is the information regarding ACC function, but the present disclosure is not limited thereto. For example, the information regarding the driving assistance function of the vehicle 10 may be information regarding the parking assistance function. Accordingly, when the parking assist function is executed, it is possible to present information about the parking assist function to the user while showing the appearance unique to the vehicle 10.

Note that the control process executed by CPU 21 reading the software (program) in the above-described embodiment may be executed by various processors other than CPU. Examples of the processor include a PLD capable of changing a circuit configuration after manufacturing a FPGA or the like, and a dedicated electric circuit that is a processor having a circuit configuration designed exclusively for executing a particular process such as ASIC. FPGA is an abbreviation for field-programmable gate array. PLD is an abbreviation for programmable logic device. ASIC is an abbreviation for application specific integrated circuit. In addition, the control process may be executed by one of these various processors, or may be executed by a combination of two or more processors (for example, a plurality of FPGA, a combination of CPU and FPGA, and the like) of the same type or different types. Further, a hardware structure of the various processors is, more specifically, an electric circuit in which circuit elements such as semiconductor elements are combined.

Further, in the above-described embodiment, an aspect in which the individual program 50 and the standard program 52 are stored (installed) in the storage unit 24 in advance has been described, but the present disclosure is not limited thereto. The individual program 50 and the standard program 52 may be provided in a form recorded in a recording medium such as a CD-ROM, DVD-ROM, and a USB memory. Note that CD-ROM is an abbreviation for compact disk read-only memory. DVD-ROM is an abbreviation for digital versatile disk read-only memory. USB is an abbreviation for universal serial bus. The individual program 50 and the standard program 52 may be downloaded from an external device via a network.

What is claimed is:

1. An information processing device comprising:
- a display unit; and
- one or more processors configured to:
- acquire a first program for causing the display unit to display a specific design element specific to a host vehicle and representing specific information specific to the host vehicle;
- acquire a second program for causing the display unit to display a common design element common to the host vehicle and another vehicle and representing common information specific to the host vehicle; and
- cause the display unit to display display information generated based on the first program and the second program, wherein:
- the one or more processors are configured to cause the display unit to display the display information generated based on the first program and the second program such that the specific design element and the common design element are arranged in a visually overlapping manner.

2. The information processing device according to claim 1, wherein:
- the specific information represents an appearance of the host vehicle; and
- the one or more processors are configured to cause the display unit to display, as the display information, information on a driving assistance function of the host vehicle.

3. The information processing device according to claim 1, wherein:
- the specific information represents an appearance of the host vehicle; and
- the one or more processors are configured to cause the display unit to display, as the display information, information on an energy flow of the host vehicle.

4. The information processing device according to claim 1, wherein:
- the specific information represents an appearance of the host vehicle and an open or closed state of a door; and
- the one or more processors are configured to cause the display unit to display, as the display information, information on the open or closed state of the door of the host vehicle.

5. The information processing device according to claim 1, wherein the one or more processors are configured to update at least one of the first program and the second program.

* * * * *